（12） United States Patent
Marcum

(10) Patent No.: US 7,546,183 B1
(45) Date of Patent: Jun. 9, 2009

(54) IN-FLIGHT VERIFICATION OF INSTRUMENT LANDING SYSTEM SIGNALS

(76) Inventor: Frank Marcum, 5584 154th La., Ramsey, MN (US) 55303

(*) Notice: Subject to any disclaimer, the term of this patent is extended or adjusted under 35 U.S.C. 154(b) by 488 days.

(21) Appl. No.: 11/373,230

(22) Filed: Mar. 10, 2006

(51) Int. Cl.
*G05D 1/00* (2006.01)
*G06F 19/00* (2006.01)
(52) U.S. Cl. .......................... 701/17; 701/213; 340/947
(58) Field of Classification Search .................. None
See application file for complete search history.

(56) References Cited

U.S. PATENT DOCUMENTS

| | | | | |
|---|---|---|---|---|
| 3,716,863 | A * | 2/1973 | Ghose et al. | 342/413 |
| 7,089,092 | B1 * | 8/2006 | Wood et al. | 701/14 |
| 7,337,063 | B1 * | 2/2008 | Oberg et al. | 701/213 |
| 2002/0040263 | A1 * | 4/2002 | Johnson et al. | 701/17 |

* cited by examiner

*Primary Examiner*—Michael J. Zanelli
(74) *Attorney, Agent, or Firm*—Kenneth P. Robinson

(57) ABSTRACT

An instrument landing system (ILS) provides signals in space receivable by an aircraft in flight to identify, for example, a point in space at which to start an approach along a glide slope path to a touchdown point on a runway. Atmospheric, ground and other conditions may cause transmission anomalies, so that the ILS signals identify a point in space displaced from its intended position. Systems and methods employed in flight use GPS or other positional data to determine the current displacement of such point, as identified by received ILS signals, from its intended position consistent with ILS specifications. In addition to reception and use of ILS and GPS signals, data on geographic runway location and correct ILS signal in space parameters is used for reference purposes in determining signal in space position discrepancies, glide slope path angular discrepancies, or both. The pilot can be alerted not to rely upon the ILS when discrepancies, which can vary on a short time basis and not be discernable from the ground, are determined to exceed safe limits.

27 Claims, 4 Drawing Sheets

IN-FLIGHT VERIFICATION OF INSTRUMENT LANDING SYSTEM SIGNALS

RELATED APPLICATIONS (Not Applicable)

FEDERALLY SPONSORED RESEARCH (Not Applicable)

BACKGROUND OF THE INVENTION

This invention relates to use of instrument landing systems by instrument-rated aircraft and, more particularly, to verification of the integrity of in-space signals transmitted by an instrument landing system.

Reduced visibility, due to adverse weather conditions, may make it difficult or impossible for a pilot to rely upon visual observation of the landing site to safely land an aircraft. The problem has been addressed by Instrument Landing System (ILS) installations at many airports. Such systems rely upon transmission of a pattern of signals in space. Equipment installed on board instrument-rated aircraft is arranged to receive the ILS signals. On a simplified overview basis, reception by an aircraft of a particular ILS signal (i.e., representative of a specific feature of a pattern in space of ILS approach signals) is intended to indicate to the pilot that the aircraft is at that time at a particular point in space relative to an aircraft runway. Thus, if a pilot who cannot see the runway, nevertheless is informed of the current position of the aircraft relative to the runway, suitable action may be taken to initiate an approach to a safe landing.

However, if the ILS signal which the pilot would rely upon is, in fact, not available at its intended position in space, any error in that position may cause the pilot to be misinformed as to the position in space of the aircraft relative to the runway. Of course, if it is known in advance that signals receivable from an ILS are not currently reliable, a pilot may be advised not to rely upon such signals. ILS signals may be monitored periodically to ensure that signals are being accurately transmitted. However, transmission anomalies affecting signals post transmission are generally not discernable from the ground. Even if the signals available from a particular ILS at an airport could be accurately verified on a day to day basis, a pilot may have to assume there has been no degradation of signal integrity in the intervening period between verifications. In fact, changing atmospheric or ground conditions, as well as other conditions such as temporary standing of a large aircraft in the field of an ILS antenna, may affect ILS signal integrity at any time and for any duration of time. As a result, in the absence of truly current information a pilot may be faced with a choice of landing with reliance on ILS signals which he is not aware are providing inaccurate indications, or redirecting the landing to a different airport.

The subject of ILS signal integrity and the monitoring thereof has been previously addressed by the present inventor and by others. See, for example, the following and references cited therein. F. Marcum, *Evaluation of Image-Type Glide Slope Performance in the Presence of Snow Cover*, IEEE Transactions on Aerospace and Electronic Systems, Vol. 34, No. 1, 71-83, January 1998; F. Marcum, *Design of an Image Radiation Monitor for ILS Glide Slope*, IEEE Transactions on Aerospace and Electronic Systems, Vol. 34, No. 3, 836-843, July 1998.

Objects of the present invention are to provide new and improved systems and methods to enable in-flight verification of instrument landing system transmissions and such systems and methods which may have one or more of the following characteristics or capabilities:

current verification of accurate positioning in space of ILS signals representing approach points;
  current indication of in-space positioning anomalies of ILS glide slope path signals;
  pilot alerts on out of specification ILS signal disparities not discernable from ground locations;
  on-board current verification of ILS signal reliability for landings;
  use of available positional and other data for independent verification of ILS information;
  cost effective on-board verification of ILS information on a current in-flight basis; and
  automated operation with pilot alerts.

SUMMARY OF THE INVENTION

In accordance with an embodiment of the invention, a system, to enable in-flight verification of an instrument landing system (ILS) transmission, may include the following. A first unit, responsive to in-flight reception of an ILS transmission, is arranged to provide a first output indicative of a point in space representative of a predetermined feature of an ILS approach to a runway. A second unit, responsive to received positional data (e.g., GPS data), is arranged to provide a second output representative of the actual location in space of the point in space indicated by the first output. A database access facility is arranged to enable access to at least one database to provide a data output representing data usable to determine an intended spatial characteristic of the ILS feature (e.g., the intended location of the same point in space or the glide path angle) consistent with accurate ILS operation (e.g., access geographical runway location data, ILS specification data, etc.). A third unit, responsive to the first, second and data outputs and arranged to provide a discrepancy output representative of a discrepancy between the intended spatial characteristic and that actual location in space.

The system may further include an indicator unit, responsive to a discrepancy output, to provide an output indicative of discrepancy exceeding a predetermined discrepancy level. In a particular embodiment, the ILS feature of interest may be the ILS glide slope path as intersected by an aircraft employing the system. The discrepancy in such case may represent a displacement of the actual intersection from what would be the intended point of intersection for ILS operation to specifications.

In accordance with the invention, an embodiment of a method, to enable in-flight verification of an instrument landing system (ILS) transmission, may include the following steps:

(a) providing a first output indicative of in-flight reception of an ILS transmission representative of a point in space relevant to a predetermined feature of an ILS approach to a runway;

(b) utilizing positional information from a source other than the ILS (e.g., GPS signals) to provide a second output representative of the actual location in space of the point in space indicated by the first output;

(c) providing a data output representative of geographical runway location and ILS approach specification data and usable to determine a spatial characteristic of that feature consistent with accurate ILS operation;

(d) providing, with use of the first, second and data outputs, an approximation of a level of error regarding the feature of the ILS approach; and (e) providing, in response to that approximation, an indication upon the level of error exceeding a predetermined value.

For a better understanding of the invention, together with other and further objects, reference is made to the accompanying drawings and the scope of the invention will be pointed out in the accompanying claims.

DESCRIPTION OF THE INVENTION

Figure 1:
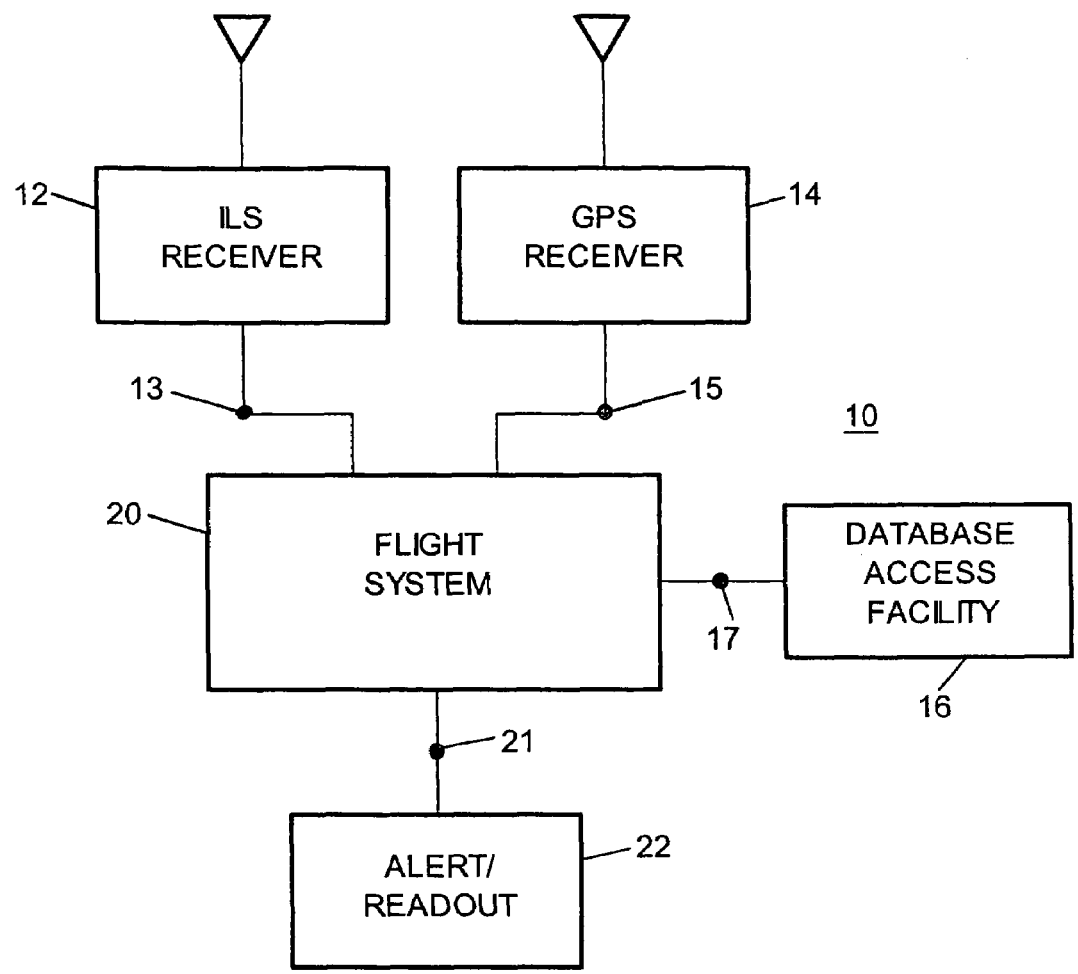
FIG. 1 is a block diagram of an embodiment of a system pursuant to the invention.

On a simplified basis, an aircraft approaching a runway with an associated ILS should intersect the ILS glide slope path at a predetermined point in space. For example, an intersection point about four miles from the end of the runway, from which point the aircraft could begin a 3° descent to arrive at the runway surface (this point may be referred to as a final approach fix or "FAF" point). Thus, the ILS may be designed to transmit a discernable signal in space extending from the runway upward at an angle of 3° above horizontal (e.g., a signal in space which is transmitted along the glide slope path, in order to define that path).

Ideally, this ILS feature of an upwardly angled discernable signal would always be steady, fixed and reliable, so that if an antenna on an aircraft proceeding at the proper altitude received a signal representative of the glide slope path the pilot would know conclusively that the aircraft was then at the proper point in space (e.g., the "intended" FAF point) from which to follow established descent procedures to the intended touchdown point on the runway. For present purposes, the intended FAF point is a point in compliance with ILS specifications for the particular runway.

However, signal propagation effects, due to atmospheric conditions, changes in ground reflectivity due to snow or water cover, a taxiing aircraft, or other causes, may affect signal transmission (i.e., cause transmission anomalies). As a result, (a) the discernable signal in space may not represent the intended glide slope path as determined by ILS specifications and (b) when the pilot receives an indication that the aircraft is at the FAF point, the aircraft may actually be at a different point in space. This different point as indicated by reception of the ILS signal (e.g., the "indicated" FAF point) may be separated in space from the intended FAF point by an unknown separation distance. Under such conditions, an aircraft starting a descent at the indicated FAF point would be headed to the ground touchdown point along a path which may be inclined at a lower angle (e.g., 2° to horizontal) so the aircraft might not clear an obstruction, or inclined at a higher angle (e.g., 4°) so the landing approach might be too steep for established landing procedures.

In this example, the intended FAF point and the indicated FAF point are separated by an unknown separation distance which may vary over some period of time (e.g., hour-to-hour or even minute-to-minute) as atmospheric, ground or other conditions change. Problems related to signal propagation changes causing ILS indications of inaccurate aircraft position could be avoided if the current accuracy of ILS signal positioning in space could be determined from the ground. However, adequate ground monitoring of actual signal propagation in space is not currently available.

As will be further discussed, pursuant to the invention, an aircraft is enabled to use the Global Positioning Satellite (GPS) system or other independent sources of position information (e.g., calibrated altimeter, marker beacon, etc.) to provide in-flight verification of whether an indicated FAF point derived from received ILS signals representative of a glide slope path is actually received at or near the intended FAF point. In addition to the electronically recognizable signal in space representative of the glide slope path feature as discussed, an ILS typically also provides signals representative of additional features (e.g., path width, localizer features, etc.) as to which verification pursuant to the invention may also be applicable.

Referring now to FIG. 1, there is illustrated a block diagram of an embodiment of a system 10 to enable in-flight verification of an ILS transmission representative of an ILS approach feature. First unit 12, shown as an ILS receiver, is responsive to in-flight reception of an ILS transmission. First unit 12 is arranged to provide a first output, at port 13, which is indicative of a point in space representative of a predetermined feature of an ILS approach to a runway. As discussed, in this example the feature is the ILS glide slope path, which determines the FAF point on that path applicable to an aircraft intersecting the glide slope path while flying toward the runway in level flight at a predetermined altitude. Without now addressing verification of other features of ILS signals, for current purposes the point in space of interest is the FAF point and first unit 12 thus provides an output at port 13 representative of the indicated FAF point. As discussed above, this "indicated" FAF point may or may not correspond closely to the "intended" FAF point which would correspond to in-specification ILS operation without signal transmission anomalies.

Second unit 14, shown as a global positioning system (GPS) receiver, is responsive to in-flight reception of GPS signals. Second unit 14 is arranged to provide a second output, at port 15, which is representative of the actual in-space location of the point in space at which the first output (representative of the relevant ILS approach feature) is provided by the first unit 12. Thus, for example, second unit 14 may be arranged to provide a stream of signals representative of the location of the aircraft as it proceeds through space to the FAF point. These GPS signals are characterized as representative of the "actual" in space location of the aircraft, subject to GPS operational tolerances regarding positional accuracy. For present purposes, a point in space location determined by use of GPS signals will be termed an "actual" location. Thus, the GPS-determined location corresponding to a first unit output representative of the indicated FAF point will be referred to as the actual FAF point. With this usage, the location of the GPS-determined actual FAF point will identify the actual location in space of the indicated FAF point, which may be separated from the intended FAF point (determined by ILS specifications). However, since the coordinates of the actual FAF point can be accurately determined (based on GPS capabilities) the separation between the actual FAF point and the intended FAF point can be accurately determined, permitting verification of the ILS transmission.

Database access facility 16 is arranged to access at least one database to provide a data output, at port 17. Unit 16 is arranged to provide, at port 17, a data output representing data usable to determine an intended spatial characteristic of the ILS approach feature. In the present example, this spatial characteristic is the intended in-space location (i.e., consistent with the ILS specifications and intended operation) of the point in space representative of the predetermined ILS approach feature (the intended FAF point in this example). It will be understood by skilled persons that the desired database data and access thereto may be provided in any suitable manner. For example, data usable to determine or compute the intended in-space location of the FAF point for a particular runway may be stored on board the aircraft when the flight plan is filed, stored on the aircraft in a storage medium covering all runways in a geographical area, accessed by suitable data link to an FAA data storage facility, or otherwise obtained. The data output at port 17 may, for example, include data on the geographical location of a runway, ILS specification data defining the position in space of the glide slope path and thereby the location of intersection with that path by an aircraft in level flight (FAF point). While the spatial characteristic in this example is the intended FAF point as discussed, in other implementations the spatial characteristic may be the intended ILS glide path angle or other aspect.

As illustrated in FIG. 1, the system 10 further includes a third unit 20, shown as a flight system to be described further, which is responsive to the respective first, second and data outputs at ports 13, 15 and 17 from units 12, 14 and 16. Third unit 20 is arranged in this example to provide, at port 21, a discrepancy output representative of a discrepancy between the intended spatial characteristic and the actual location in space, which in this example is represented by a variation between the intended location of the FAF point in space and the current actual location of the FAF point in space. Thus, by use of the data output at port 17, the intended location in space at which the ILS should accurately position the FAF point can be determined. By use of the GPS data the actual location in space of the indicated FAF point (as indicated by received ILS signals) can be determined. As will be appreciated, the actual location may vary day-to-day or hour-by-hour, as atmospheric conditions, ground conditions, etc. change, thereby causing transmission anomalies and affecting in-space transmission of ILS signals. As a result, the discrepancy output provided by third unit 20 at port 21 may vary over time to represent anything from zero distance to a large distance in space between the intended location and the actual location of the FAF point in space. The discrepancy output at port 21 thus represents the magnitude of error inherent in the location of the FAF point represented by the ILS signals as currently received by an aircraft. As discussed, if a large such error is currently inherent in reliance on the received ILS signals, an aircraft following ILS landing procedures could be directed to descend along a glide slope path at a dangerously high or low angle to the horizontal.

In FIG. 1, an indicator unit 22, shown as an alert/readout unit, is arranged to be responsive to the discrepancy output provided at port 21 by third unit 20. Indicator unit 22 may be arranged in any configuration suitable to provide a visual or aural alarm to alert a pilot of a discrepancy output representing a discrepancy exceeding a predetermined level, or a calibrated readout viewable by a pilot to indicate the magnitude of a discrepancy, or both, as may be determined to be appropriate in view of similar implementations in aircraft applications. Thus, alarm soundings, flashing lights, instrument presentations or other pilot interface arrangements may be employed for the purpose of providing discrepancy information to the pilot. As will be understood, while the glide slope path and associated FAF point have been addressed by way of example for purposes of description, the foregoing is also applicable to in-flight verification of signals in space representative of other ILS approach features and determination of the presence or absence of current discrepancies therein.

Figure 2:
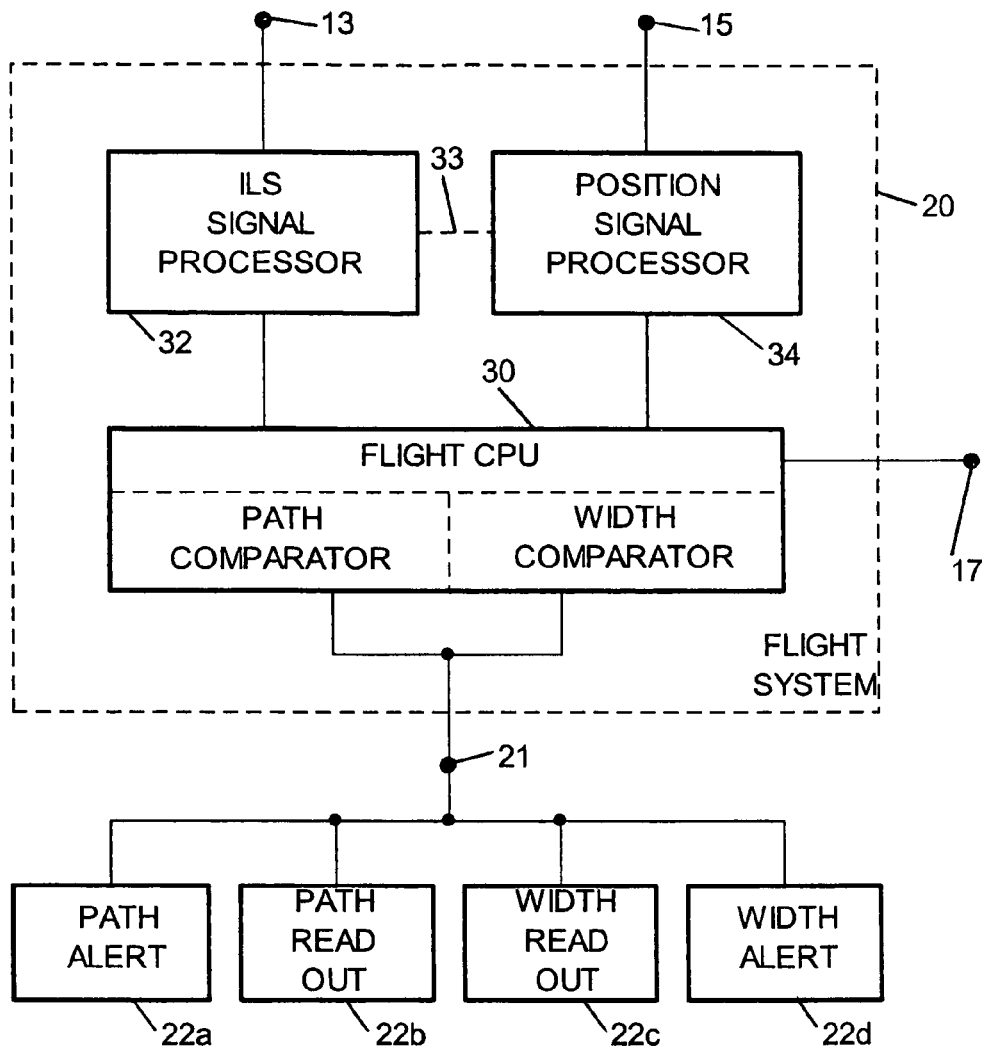
FIG. 2 is a block diagram of a more detailed embodiment of portions of the FIG. 1 system.

With reference to FIG. 2, there is shown an embodiment of third unit 20 of FIG. 1 in greater detail. ILS signal processor unit 32, responsive to signals from first unit 12 via port 13, may be arranged to use the ILS signals to derive signal levels usable as trigger events indicative of an intersection of the glide slope path by the aircraft (e.g., occurrence of a 0μ ampere or "0 μA" signal level as presented on a cockpit ILS display). The recognition of such a signal level in a received signal may be used as a trigger event to identify a point in space (e.g., the ILS indicated location of the FAF point) and enable determination of the actual location of that point (e.g., by use of GPS data). Position signal processor 34, responsive to signals from unit 14 via port 15, may be arranged in this example to use GPS data to derive position data on a current basis as the aircraft travels through space (e.g., in level flight toward the FAF point). Unit 34 may provide such position data on a continuing basis for further processing or may, for example be arranged to receive a trigger signal from unit 32 via path 33 and in response flag the ILS data applicable to the time of receipt of the trigger signal.

As shown, FIG. 2 includes unit 30 labeled as a flight CPU (central processing unit) arranged to receive data from units 32 and 34 and also receive the data output from unit 16, via port 17. Unit 30 may be arranged to process the data inputs in order to compare the intended location of the FAF point, as determined from the data output from port 17, with the indicated location of the FAF point, as determined from the GPS data triggered by the aircraft interception of the glide slope path. In FIG. 2, unit 30 is illustrated as including path and width comparators (which may be implemented via software, hardware, etc.) to address verification of an ILS glide slope path feature (and derive high and low discrepancy values) as well as width verification of an ILS localizer course feature (and derive left and right discrepancy values) for example. In the context of the FIG. 2 embodiment, glide slope discrepancy outputs, as well as discrepancy outputs for other ILS approach signal features may be provided via a multi-conductor coupling to port 21. As discussed above, a variety of forms of indicator units may be coupled to port 21, to provide discrepancy alerts or readouts for one or more ILS approach signal features in any suitable type of presentation for pilot use. FIG. 2 includes, by way of example, path alert unit 22a, path readout unit 22b, width readout unit 22c and width alert unit 22d Operational aspects will now be considered on an overview basis with reference to FIG. 3 which, for clarity of presentation, is not necessarily to scale. Terminology commonly employed by persons familiar with ILS operations and in the FAA Flight Inspection Manual and other relevant publications may be used.

Figure 3:
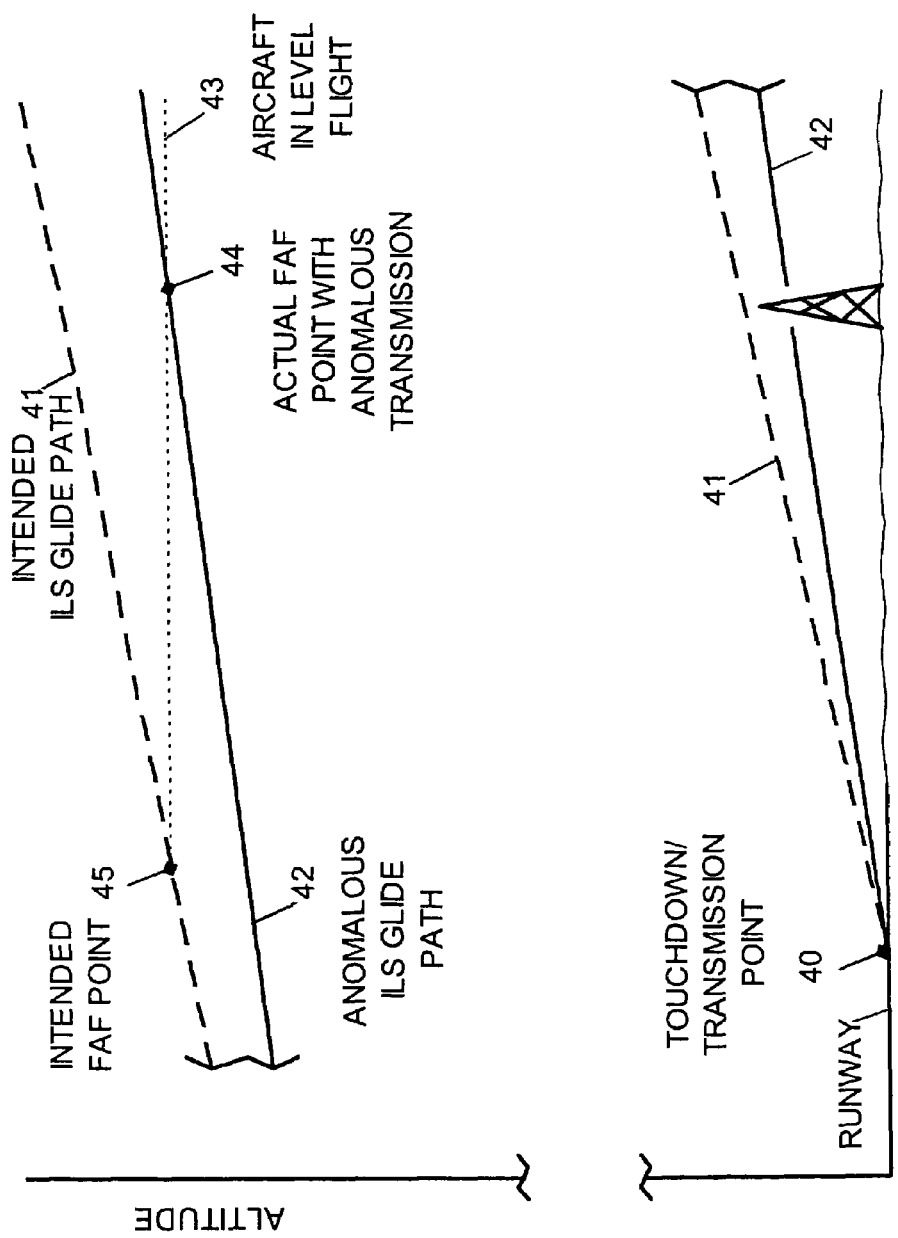
FIG. 3 is a representation of transmission of ILS signals from a touchdown point (lower portion) and higher altitude reception of the signals by an aircraft at intended vs. displaced points (upper portion).

In FIG. 3, the lower portion illustrates an intended ILS glide slope path (i.e., meeting ILS specifications) implemented via ILS signals transmitted from a runway touchdown/transmission point 40 at a vertical angle (e.g., 3°). This intended glide slope path is shown as dashed line 41. Solid line 42 represents the actual glide slope path as transmitted at a particular time under conditions of anomalous transmission. While possible causes are referred to above, particulars of actual in space transmission of signals under conditions affected by anomalies are beyond the scope of present discussion. In FIG. 3, the actual glide slope path (with anomalous transmission) is shown as intersecting the upper portion of a ground structure, such as a tower.

The upper portion of FIG. 3 is intended to illustrate continuations of paths 41 and 42 into space as they extend to the right beyond the limit of the lower portion of the figure. Dashed line 43 represents an aircraft in level flight (i.e., proceeding horizontally) going from right to left. As shown, the aircraft intersects the actual glide slope path (existing at this time below the intended path due to transmission anomalies) at actual FAF point 44. As indicated, in the absence of transmission anomalies the aircraft would have intersected the intended glide slope path 41 at intended FAF point 45. Thus, actual FAF point 44 represents a glide slope path lowered by anomalous transmission of the ILS signals (e.g., a glide slope path extending at about a 2° angle to the touchdown point 40). As shown the actual FAF point 44 is horizontally displaced from the intended FAF point 45 and this separation is representative of the angular discrepancy between the anomaly affected glide slope path 42 and the intended glide slope path 41.

For present purposes, it is assumed an aircraft is en route to a terminal approach procedure at a destination airport. Upon reaching an initial approach position, the pilot enters approach mode information into the aircraft's flight system, including airport, runway and category of approach consistent with FAA, air traffic control and normal landing procedures. In response, an onboard computer accesses, from a database, data on the location of the runway and threshold/touchdown point (e.g., bearing, latitude, longitude and elevation), as well as data on the ILS system operative for the runway (e.g., commissioned/intended glide path angle, glide path vertical width and symmetry of upper and lower half-widths of the glide path). It will be appreciated that relevant data may be available in different forms or characterizations which are usable for present purposes, or that it may become desirable to prepare and store data in advance in readily accessible form for present usages.

The basic objective may be to verify that the glide slope path as represented by ILS signals received by an aircraft in flight extends from a runway touchdown point into space at the commissioned/intended angle (e.g., 3° above horizontal). Verification of the glide slope angle may be approached from the point of view of receiving a signal in space and then determining the vertical angle above horizontal represented by a line between that point in space and the touchdown point, for comparison with the glide path angle the ILS is intended to provide. Thus, with appropriate processing of data, a point in space (in the context of a known touchdown point) is representative of a vertical angle for purposes of comparison with a point representative of an intended glide slope angle. In this context, the point in space is representative of a spatial characteristic of the glide slope path and can be used to determine the actual current angle of the glide slope path for comparison with the intended glide slope angle.

Reference data regarding the runway touchdown point and ILS parameters can be processed in order to define a point in space at which an aircraft in level flight at a predetermined altitude should intercept the glide slope path. This point may be termed the intended Final Approach Fix (intended FAF) point. Then, when the aircraft receives the ILS signal representing interception of the glide slope path at a point in space, GPS signals may be utilized to accurately determine the actual location of that point in space (the actual FAF point). A discrepancy output can then be determined as representative of the separation between these two points in space as derived from the runway/ILS data and the GPS data. In this context, the point in space is representative of the actual FAF point and can be used for comparison with the intended FAF point as computed based on accessed data.

This discrepancy value, while not in terms of glide slope angle error, can be converted into a scale of acceptable and unacceptable ILS operational verification levels by a predetermination of what level of separation value is representative of an unacceptable angular discrepancy. That is to say, once discrepancy data is derived, it may be utilized in the context of one or both of point to point error or angle to angle error or otherwise, as may be determined by skilled persons to be suitable in particular implementations. Thus, with utilization of the point in space location determined by GPS data, verification pursuant to the invention is described above in terms of determination of a discrepancy output derived from a variation between intended and actual points in space. Beginning with separation information, such determination may be implemented pursuant to the invention on the basis of separation discrepancy, on the basis of conversion to angular discrepancy, or by any other mode of analysis as may be provided by skilled persons having an understanding of the invention.

On an angular basis, the activated flight computer monitors the received ILS signals for a 75 $\mu$A signal level point, which would correspond to the aircraft intersecting the glide slope lower width point. The GPS data is also received and stored with a time stamp. When the ILS lower width point is recognized on the basis of the signal current level, a trigger signal causes acquisition of the GPS coordinates in space corresponding to the time of occurrence of the 75 $\mu$A signal level. These coordinates are processed against data representative of the runway touchdown point, enabling calculation of an equivalent elevation angle of the lower width point based on the GPS data. This process is repeated when the ILS glide path (i.e., the centerline thereof) is recognized on the basis of recognition of a received 0 $\mu$A signal level and the corresponding GPS data is used to compute the equivalent elevation angle of the glide path above the runway horizon.

The latter computed elevation angle can then be compared against the commissioned/intended glide slope path angle for the ILS at this runway. If the computed elevation angle derived from the received ILS signal is not within tolerances, in view of US Flight Inspection Manual data for example, an alert can be provided to the pilot by the onboard alert/readout unit. The pilot may also be informed via the readout if lower landing category tolerances permit a landing pursuant to existing procedures for a lower category approach. As appropriate, air traffic control personnel may also be alerted by the pilot or by the system. Results as discussed regarding the ILS glide slope lower width point may be handled in the same manner, with the pilot alerted if appropriate, etc. Use of angular discrepancies, or FAF point separation data as representation of such angular discrepancies, may thus be utilized pursuant to the invention, with the particular methodology of analysis as determined by skilled persons to be appropriate in particular implementations.

The preceding description has made specific reference to verification of the ILS feature comprising the glide slope path, which provides vertical guidance to a pilot proceeding along the glide slope during descent to landing. Pursuant to the invention, in-flight verification of other features, such as ILS localizer signals provided in conjunction with the glide slope signals to provide lateral guidance to the pilot, may be provided by systems configured by skilled persons having an understanding of the invention.

Figure 4:
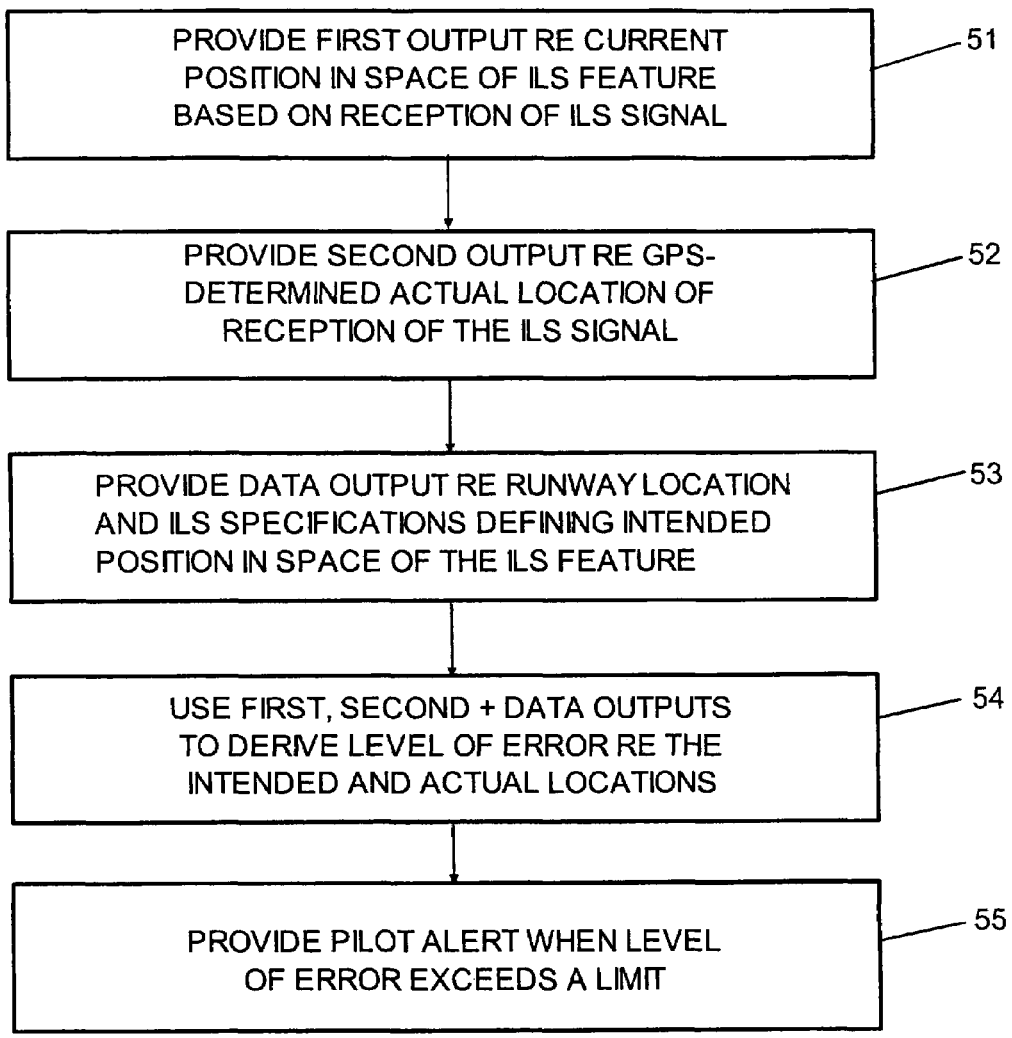
FIG. 4 is a form of flow diagram useful in describing a method pursuant to the invention.

With reference to FIG. 4, there is presented a form of flow chart summarizing steps of an embodiment of a method to enable in-flight verification of an ILS transmission. The method may comprise the following steps.

At 51, providing a first output indicative of in-flight reception of an ILS transmission representative of a point in space relevant to a predetermined feature of an ILS approach to a runway. The first output may be indicative of the location in space of an ILS glide slope path, for example.

At 52, utilizing positional information from a source other than the ILS to provide a second output representative of the actual in-space location of the point in space at which the first output is provided. The second output may be based on reception and processing of GPS signals, signals representative of altitude, other positional data, etc.

At 53, a data output representative of geographical runway location and ILS approach specification data and usable to determine the intended in-space location of a point in space consistent with accurate ILS operation.

At 54, providing, with use of the first, second and data outputs, an approximation of a level of error, regarding the feature of the ILS approach, representative of a variation between the intended and actual in-space locations. The level of error may be indicative of an ILS glide path angle discrepancy, of separation of intended and actual FAF points representative of a glide path angle discrepancy, etc.

At 55, providing an indication or alert to the pilot, in response to that approximation, when the level of error exceeds a predetermined value. Such indication or alert may, for example, be via a visual or aural presentation, or both.

While there have been described the currently preferred embodiments of the invention, those skilled in the art will recognize that other and further modifications may be made without departing from the invention and it is intended to claim all modifications and variations as fall within the scope of the invention.

What is claimed is:

1. A system, to enable in-flight verification of an instrument landing system (ILS) transmission, comprising:
   a first unit, responsive to in-flight reception of an ILS transmission to provide a first output indicative of a point in space representative of a predetermined feature of an ILS approach to a runway;
   a second unit, responsive to received positional data, to provide a second output based on reception and processing of GPS signals and representative of the actual location in space of the point in space indicated by said first output;
   a database access facility arranged to enable access to at least one database to provide a data output representing data usable to determine an intended spatial characteristic of said feature consistent with accurate ILS operation; and
   a third unit, responsive to said first, second and data outputs and arranged to provide a discrepancy output representative of a discrepancy between said intended spatial characteristic and said actual location in space.

2. A system as in claim 1, additionally comprising:
   an indicator unit, responsive to said discrepancy output, to provide an output indicative of discrepancy exceeding a predetermined discrepancy level.

3. A system as in claim 1, wherein said first unit provides a first output indicative of a point in space relative to a glide slope path of the ILS approach.

4. A system as in claim 1, wherein said first unit provides a first output indicative of a point in space representing intersection by an aircraft of an ILS signal representative of an ILS approach feature.

5. A system as in claim 1, wherein said first output is used to trigger capture of positional data included in said second output.

6. A system as in claim 1, wherein said database access facility is arranged to access at least one database to provide a data output representing geographical runway location and ILS approach path configuration.

7. A system as in claim 1, wherein said database access facility is arranged to access at least one database to provide a data output representing data usable to determine the intended location of said point in space consistent with accurate ILS operation.

8. A system as in claim 1, wherein said third unit is arranged to provide a discrepancy output representative of an ILS glide path angle discrepancy.

9. A system as in claim 1, wherein said third unit is arranged to provide a discrepancy output representative of an ILS localizer course positional discrepancy.

10. A system as in claim 1, wherein said third unit is one of a flight management system and a central processor unit.

11. A system as in claim 1, wherein said third unit is arranged to provide a discrepancy output indicative of a discrepancy relative to ILS operational tolerances.

12. A method, to enable in-flight verification of an instrument landing system (ILS) transmission, comprising the steps of:
   (a) providing a first output indicative of in-flight reception of an ILS transmission representative of a point in space relevant to a predetermined feature of an ILS approach to a runway;
   (b) utilizing positional information from a source other than said ILS to provide a second output representative of the actual location in space of the point in space indicated by said first output;
   (c) providing a data output representative of ILS approach specification data and usable to determine a spatial characteristic of said feature consistent with accurate ILS operation; and
   (d) providing, with use of said first, second and data outputs, an approximation of a level of error regarding said feature of the ILS approach.

13. A method as in claim 12, wherein said first output is indicative of the location in space of an ILS glide slope path.

14. A method as in claim 12, wherein said approximation of a level of error is representative of an ILS glide path angle discrepancy.

15. A method, to enable in-flight verification of an instrument landing system (ILS) transmission, comprising the steps of:
   (a) providing a first output indicative of in-flight reception of an ILS transmission representative of a point in space relevant to a predetermined feature of an ILS approach to a runway;
   (b) utilizing positional information from a source other than said ILS to provide a second output representative of the actual location in space of the point in space indicated by said first output;
   (c) providing a data output representative of geographical runway location and ILS approach specification data and usable to determine the intended location of said point in space consistent with accurate ILS operation;
   (d) providing, with use of said first, second and data outputs, an approximation of a level of error, regarding said aspect of the ILS approach, representative of a variation between said intended and actual in-space locations and
   (e) providing, in response to said approximation, an indication upon said level of error exceeding a predetermined value.

16. A method as in claim 15, wherein said first output is indicative of the location in space of an ILS glide slope path.

17. A method as in claim 15, wherein said second output is based on reception and processing of GPS signals.

18. A method as in claim 15, wherein said second output is based at least partially on altitude data.

19. A method as in claim 15, wherein said first output is used to trigger capture of positional data included in said second output.

20. A method as in claim 15, wherein said approximation of a level of error is representative of an ILS glide path angle discrepancy.

21. A method as in claim 15, wherein said approximation of a level of error relates to an error relative to ILS operational tolerances.

22. A method as in claim 15, wherein said indication provided in step (e) comprises at least one of a visual presentation and an aura presentation.

23. A system, to enable in-flight verification of an instrument landing system (ILS) transmission, comprising:
- a first unit, responsive to in-flight reception of an ILS transmission, to provide a first output indicative of a point in space representative of a predetermined feature of an ILS approach to a runway;
- a second unit, responsive to received positional data, to provide a second output based at least partially on altitude data and representative of the actual location in space of the point in space indicated by said first output;
- a database access facility arranged to enable access to at least one database to provide a data output representing data usable to determine an intended spatial characteristic of said feature consistent with accurate ILS operation; and
- a third unit, responsive to said first, second and data outputs and arranged to provide a discrepancy output representative of a discrepancy between said intended spatial characteristic and said actual location in space.

24. A system as in claim 23, additionally comprising:
- an indicator unit, responsive to said discrepancy output, to provide an output indicative of discrepancy exceeding a predetermined discrepancy level.

25. A system as in claim 23, wherein said first unit provides a first output indicative of a point in space relative to a glide slope path of the ILS approach.

26. A system as in claim 23, wherein said first output is used to trigger capture of positional data included in said second output.

27. A system as in claim 23, wherein said third unit is arranged to provide a discrepancy output representative of an ILS glide path angle discrepancy.

* * * * *